Oct. 31, 1967
C. C. TURNER
3,350,684
VEHICLE BRAKE AND TURN SIGNAL LIGHTING SYSTEM
Filed March 23, 1965
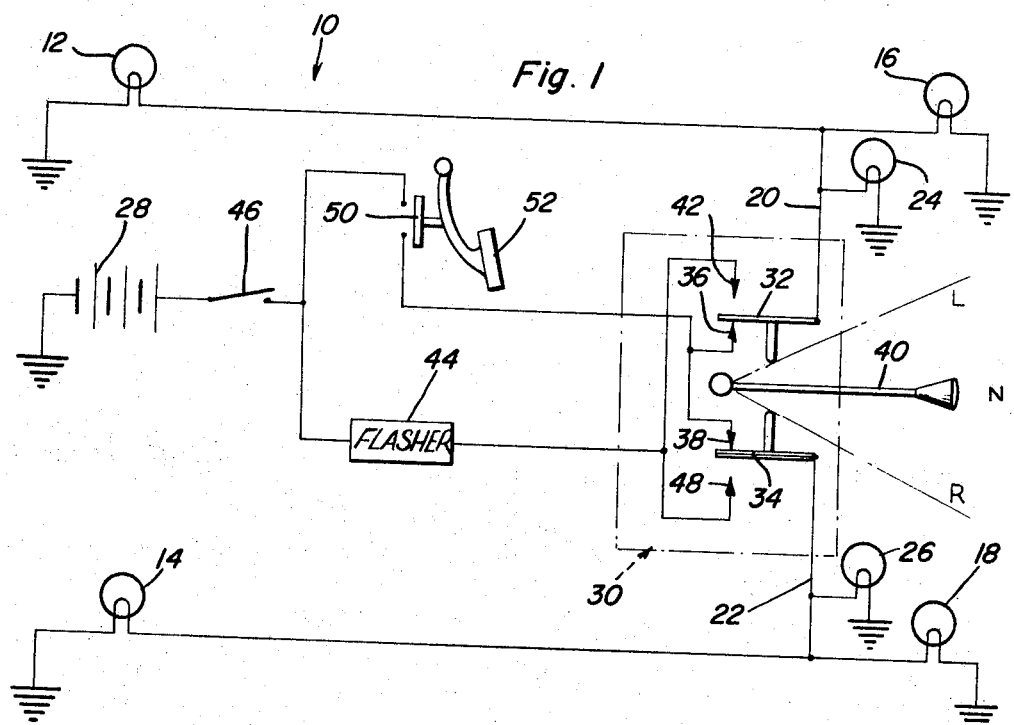
Fig. 1
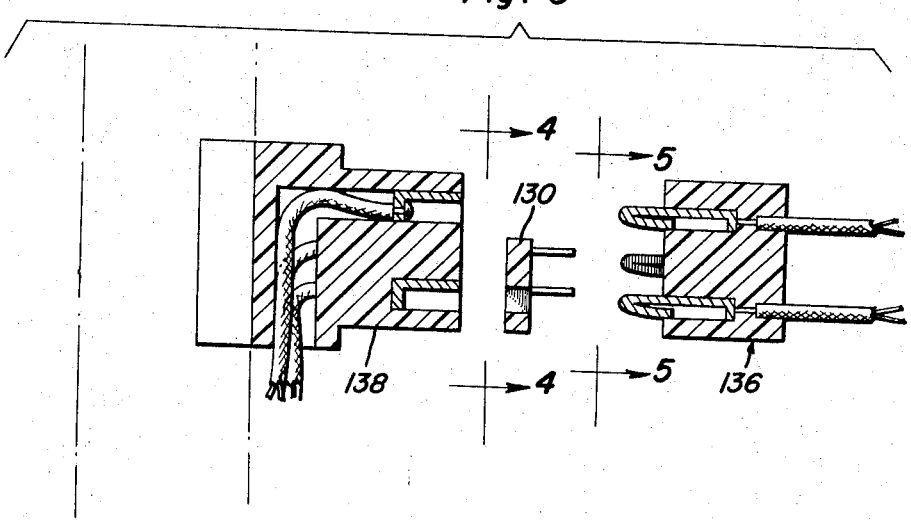
Fig. 3
Fig. 4
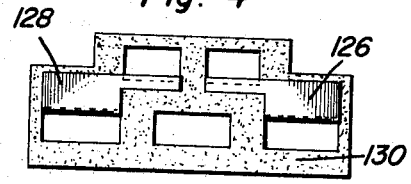
Clarence C. Turner
INVENTOR.

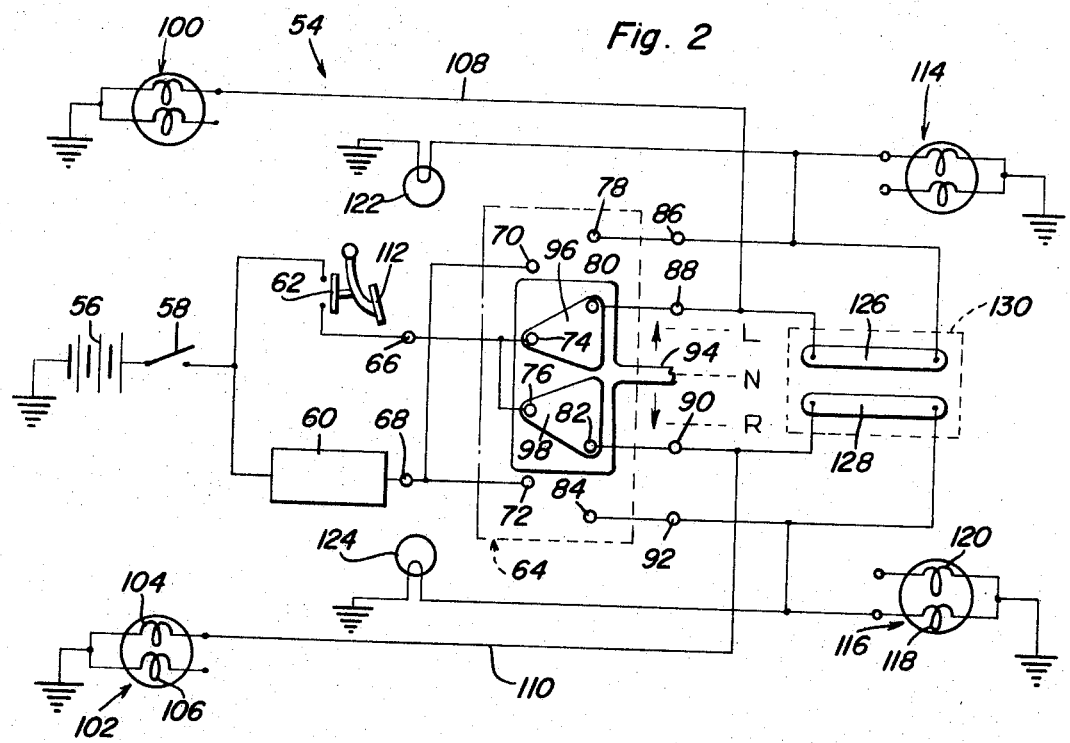
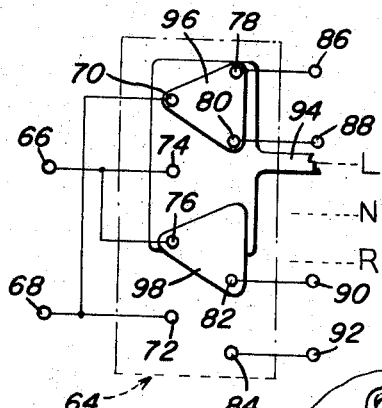
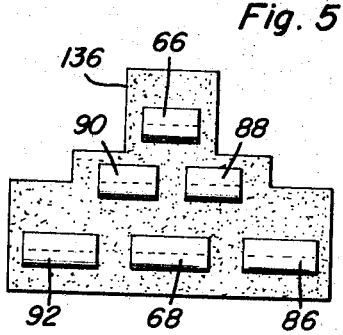
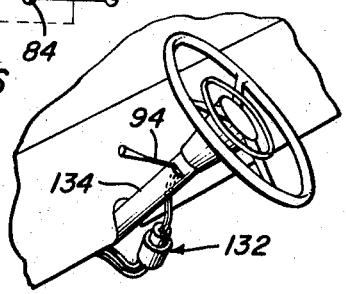
Clarence C. Turner
INVENTOR.

United States Patent Office 3,350,684
Patented Oct. 31, 1967

3,350,684
VEHICLE BRAKE AND TURN SIGNAL LIGHTING SYSTEM
Clarence C. Turner, Marion, Ind., assignor to T.H.K. Manufacturing Company, Inc., a corporation of Indiana
Filed Mar. 23, 1965, Ser. No. 442,044
5 Claims. (Cl. 340—67)

ABSTRACT OF THE DISCLOSURE

The turn signal lighting system of an automotive vehicle is interrelated with the stop light signalling system through a connecting plug and socket assembly in order to continuously illuminate all signal lamps when the turn signal switch is in a neutral position and the brake switch is closed. This is effected through a parallel circuit bypassing the flasher associated with the turn signal lamp operation.

This invention relates to vehicle lighting systems and more particularly to a combined brake and turn signal lighting system.

The lighting systems utilized in present day automotive vehicles, are deliberately designed to maintain operational independence between the brake lighting system and the turn signal lighting system. The lighting system of the present invention therefore departs from vehicle lighting systems heretofore utilized in that the vehicle brake lights are operationally interrelated with the turn signal lighting system to advantage.

It is therefore an important object of the present invention to provide an interrelated lighting system for automotive vehicles wherein both of the front turn signal lamps will be continuously energized simultaneously with the brake lights so as to provide an indication of brake application from both the rear as well as the front of the vehicle.

An additional object of the present invention is to provide a vehicle lighting system as aforementioned which is not incompatible with turn signal operation wherein the front and rear vehicle lamps on one side of the vehicle are intermittently energized to indicate the driver's intention to turn in one direction by displacement of the turn signal device from a neutral position.

A still further object of the present invention is to provide dash mounted pilot lamps through which the operating conditions of the front and rear lamps on either side of the vehicle will be indicated to the driver within the vehicle. In this manner, the driver may be appraised of the operating condition of the brake lights in addition to the operational condition of the turn signal circuit. Inspection of the brake lights from outside the vehicle may thereby be avoided.

Yet another object of the present invention is to provide a vehicle lighting system in accordance with the foregoing objects by a relatively simple conversion of existing lighting systems.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an electrical circuit diagram illustrating one form of a vehicle lighting system made in accordance with the present invention.

FIGURE 2 is an electrical circuit diagram illustrating a vehicle lighting system converted to the system of the present invention.

FIGURE 2A is a diagram illustrating a portion of the circuit depicted in FIGURE 2 in another operative condition.

FIGURE 3 is a side sectional view of disassembled parts of a disconnecting device associated with the converted vehicle lighting system illustrated in FIGURE 2.

FIGURE 4 is a front elevational view as viewed from section line 4—4 in FIGURE 3.

FIGURE 5 is a front elevational view as viewed from section line 5—5 in FIGURE 3.

FIGURE 6 is a partial perspective view illustrating the installation of the disconnecting device for converting the vehicle lighting system in accordance with the present invention.

Referring initially to FIGURE 1, it will be observed that the vehicle lighting system generally referred to by reference numeral 10 is associated with the usual rear brake lights including the rear, left brake lamp 12 and the rear, right brake lamp 14. The rear brake lamps are grounded and respectively connected in parallel with grounded front signal lamps 16 and 18 to a source of electrical potential through supply lines 20 and 22. Also connected to the supply lines 20 and 22 so as to complete parallel energizing circuits, are dash mounted pilot lamps 24 and 26. It will therefore be apparent, that the pilot lamp 24 will be energized simultaneously with the left side lamps 12 and 16 whether they be continuously or intermittently energized in order to indicate to the driver the operating condition of said lamps. Similarly, the pilot lamp 26 will indicate to the driver the operating condition of the rear and front lamps 14 and 18 on the right side of the vehicle.

The supply lines 20 and 22 are therefore connected to a source of electrical energy in the form of the vehicle battery 28 through a turn signal switch assembly generally referred to by reference numeral 30. The turn signal switch assembly includes a pair of movable switch elements 32 and 34 respectively connected to the supply lines 20 and 22. One of the switch elements 32 and 34 is adapted to be displaced from the positions illustrated in FIGURE 1 wherein they engage the fixed contacts 36 and 38. Displacement of one of the switch elements is therefore effected by the displacement of the turn signal actuator 40 from its neutral position. When displaced in one direction to indicate a left turn, the actuator 40 will displace the switch element 32 into engagement with a fixed contact 42 so as to establish an electrical connection between the supply line 20 and the output side of the flasher device 44. The flasher device is therefore connected to the output terminal of the grounded battery 28 upon closing of the ignition switch 46 in order to supply energizing current through supply line 20 intermittently interrupted by the flasher device. Similarly, displacement of the turn signal actuator 40 in order to indicate a right turn, will displace the switch element 34 into engagement with a contact 48 in order to establish the same intermittently interrupted energizing circuit through supply line 22. It will therefore be apparent, that displacement of the turn signal actuator 40 in either direction from its neutral position will cause intermittent energization of the front and rear lamps and the corresponding pilot lamp on one side of the vehicle.

When the turn signal switch assembly 30 is in its illustrated neutral position, continuous energization of all of the lamps in the lighting circuit may be effected upon closing of the brake switch 50 when the vehicle brake pedal 52 is depressed in order to apply the vehicle brakes. Thus, closing of the brake switch 50 establishes an electrical connection from the battery 28 through the ignition switch 46 and through the contacts 36 and 38 engaged with the switch elements 32 and 34, in order to simultaneously supply energizing current to all of the lamps through the supply lines 20 and 22 by passing the flasher device 44. Should one of the switch elements 32 or 34 be displaced into its other operative position by displacement of the turn signal actuator 40 in one direction or the other, the lamps on one side of the vehicle will then be intermittently energized by establishment of a parallel energizing circuit through the flasher device 44, the lamps on the other side however remaining continuously energized.

It will be apparent from the foregoing description of the lighting system 10 depicted in FIGURE 1, that normal turn signal operation will occur upon displacement of the turn signal switch assembly 30 from its neutral position by intermittent energization of the front and rear lamps on one side of the vehicle as well as intermittent energization of the corresponding pilot lamp within the vehicle. Also, depression of the brake pedal 52 will effect continuous energization of the rear brake lamps 12 and 14 as is customary. However, the lighting system will also cause continuous energization of the front lamps 16 and 18 so as to indicate application of the vehicle brakes from the front of the vehicle. At the same time, operation of the brake lamps will also be indicated by continuous energization of the pilot lamps so as to provide the driver with an indication of the operating condition of the brake lamps avoiding inspection of the vehicle externally thereof. Brake and turn signal operation of the lighting system may also be effected simultaneously resulting in the continuous energization of the lamps on one side of the vehicle indicating the application of the brakes and intermittent energization of the lamps on the other side of the vehicle indicating the driver's desire to turn in the corresponding direction.

Referring now to the vehicle lighting system generally denoted by reference numeral 54 in FIGURE 2, it will again be noted that the grounded vehicle battery 56 is connected through the ignition switch 58 to both a flasher device 60 and the brake pedal operated switch 62 so as to establish alternate current paths to the turn signal switch assembly 64 through terminal connections 66 and 68. The turn signal switch assembly 64 includes spaced outer contacts 70 and 72 connected to the terminal 68 while inner spaced contacts 74 and 76 are connected to the terminal 66. Spaced contacts 78, 80, 82 and 84 are also provided in the turn signal switch assembly, said contacts being respectively connected to connection terminals 86, 88, 90 and 92. The turn signal switch assembly is also provided with a switch actuator mechanism 94 arranged so that in the neutral position thereof, the contact plate 96 will bridge the contacts 74 and 80 while the contact plate 98 bridges the contacts 76 and 82. When the switch actuator mechanism 94 is displaced in one direction so as to indicate the driver's intention to turn in such direction as for example in a leftward direction as illustrated in FIGURE 2A, contact plate 96 will be shifted while contact plate 98 remains in place. The shifted contact plate will accordingly then bridge the contacts 70 and 78. Similarly, displacement of the switch actuator mechanism 94 in the opposite direction so as to indicate the driver's intention to make a right turn, will cause the contact plate element 98 to bridge the contacts 72 and 84.

Associated with the vehicle lighting system 54, are a pair of rear lamp assemblies 100 and 102. Each of the rear lamp assemblies includes a brake and turn signal filament 104 connected in parallel to ground with a taillight filament 106. The brake and turn signal filaments of the respective rear lamp assemblies are connected to the turn signal switch assembly 64 through the terminals 88 and 90 and the current supply lines 108 and 110. It will therefore be apparent, that when the brake switch 62 is closed by depression of the brake pedal 112, an energizing circuit will be established from the battery 56 through ignition switch 58 and contact plates 96 and 98 to the current supply lines 108 and 110 when the turn signal switch assembly is in the neutral position illustrated in FIGURE 2. Continuous energization of the rear lamps 100 and 102 is thereby effected to indicate brake application. The system is also operative to indicate the driver's intention to turn in one direction by intermittent energization of one of the front signal lamp assemblies 114 and 116. Each of the front lamp assemblies therefore includes a turn signal filament 118 grounded in parallel with a parking filament 120 associated with the parking lamp switch provided with the vehicle. The turn signal filaments of the lamp assemblies 114 and 116 on the other hand, are connected to the turn signal switch assembly 64 through the terminals 86 and 92 so that when the turn signal switch assembly is displaced in one direction from its neutral position, an energizing circuit will be established for one of the front lamp assemblies intermittently interrupted by the flasher device 60 inasmuch as the flasher device will then be connected through terminal 68 to either the contact 78 or 84 depending upon the direction in which the turn signal switch assembly has been displaced. A dash mounted pilot lamp 122 is connected in parallel with the turn signal filament of the front lamp assembly 114 while a pilot lamp 124 is connected in parallel with the filament 118 of the front lamp assembly 116. Thus, the pilot lamps will be intermittently energized simultaneously with the front lamp assemblies in connection with turn signal operation and will also be continuously energized simultaneously with the front lamp assemblies so as to indicate application of the brakes.

It will be apparent that when one of the front lamps is being intermittently energized by establishment of the energizing circuit through the flasher device 60, a parallel connection will also be made either through terminal 88 or terminal 90 to the corresponding rear lamp assembly so as to effect intermittent energization thereof indicating a turn from the rear of the vehicle. When the turn signal switch assembly is in the neutral position, continuous energization of the front lamp assemblies may be effected together with the rear lamp assemblies by the electrical connection established by the jumper strips 126 and 128 which electrically bridge the terminals 88 and 86 and the terminals 90 and 92. Accordingly, the jumper strips may be suitably mounted on a nonconductive adapter plate 130 in order to convert the vehicle lighting system into the system of the present invention resulting in continuous energization of the front lamp assemblies when the turn signal indicator switch assembly is in its neutral position so as to indicate application of the brakes from the front of the vehicle as well as from the rear of the vehicle. Continuous energization of the front lamp assemblies on one side of the vehicle will therefore be maintained even when the front lamp on the other side of the vehicle is being intermittently energized in connection with turn signal operation. Further, since the pilot lamps 122 and 124 are connected in parallel with the front lamp assemblies, the pilot lamps will indicate both turn signal and brake operation of the vehicle lighting system similar to the operation described in connection with FIGURE 1.

Conversion of a vehicle lighting system involving both rear brake lamps and front signal lamps controlled by the turn signal switch assembly is effected by mounting of the jumper strips in the disconnectible plug device 132 shown in FIGURE 6, through which electrical connection are made between the turn signal switch assembly mounted on the steering wheel 134 of the vehicle and the vehicle lighting system as depicted in FIGURE 2. Referring therefore to FIGURES 3, 4 and 5, one form of disconnectible plug device 132 is illustrated including a plug element 136 from which a plurality of prongs extend for reception within electrical sockets mounted in a plug receptacle 138. The prongs when received within the plug receptacle thereby establish terminal connections 66, 68, 86, 88, 90 and 92 as described in connection with FIGURE 2. The jumper mounting plate 130 may therefore be sandwiched between the plug 136 and plug receptacle 138 so that the jumper elements 126 and 128 mounted thereon will respectively bridge the terminal prongs 86 and 88 and 90 and 92 as diagrammatically illustrated in FIGURE 2. Thus, insertion of the adapter plate 130 between the plug and receptacle of the disconnectible plug device 132 will convert one form of vehicle lighting system into the system of the present invention.

It will be apparent from the foregoing description, that a vehicle lighting system may either be initially provided for a vehicle or one form of existing system converted into the system of the present invention so as to interrelate the brake lighting and turn signal operations in such a fashion that they will not be incompatible with each other and yet contribute to the performance of additional functions of advantageous nature including continuous energization of the front lamps to indicate brake application and to provide the driver with facilities internally of the vehicle by which the operation of the brake lights may be monitored.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a lighting system for a vehicle having a pair of rear brake lamps adapted to be simultaneously energized upon closing of a pedal operated brake switch, a pair of front signal lamps one of which is adapted to be intermittently energized upon displacement of a turn signal device in one direction from a neutral position and a pair of pilot lamps one of which is adapted to be energized simultaneously with the front signal lamps to indicate operation thereof, an interconnecting circuit comprising, a source of electrical energy for said lamps, flasher means interconnecting said source to the turn signal device for intermittent energization of one of said front signal lamps in response to displacement of the turn signal device, means connecting the respective rear brake lamps in parallel with said pilot lamps and said front signal lamps for simultaneous energization of one of the rear brake lamps with the intermittently energized front signal lamps, and means interconnecting the brake switch between the source and the turn signal device in by-pass relation to the flasher means for continuous energization of all of the lamps when the turn signal device is in the neutral position.

2. In a lighting system for a vehicle having a turn signal device, a pair of rear brake lamps adapted to be simultaneously energized upon closing of a pedal operated brake switch when the turn signal device is in a neutral position, a pair of front signal lamps one of which is adapted to be intermittently energized upon displacement of said turn signal device in one direction from said neutral position and a pair of pilot lamps one of which is adapted to be energized simultaneously with the front signal lamps to indicate operation thereof, an interconnecting circuit comprising, a source of electrical energy for said lamps, flasher means interconnecting said source to the turn signal device for intermittent energization of one of said front signal lamps in response to displacement of the turn signal device, means connecting the respective rear brake lamps to the turn signal device for simultaneous energization of one of the rear brake lamps with the intermittently energized front signal lamps, means interconnecting the brake switch between the source and the turn signal device in by-pass relation to the flasher means for continuous energization of said rear brake lamps in response to closing of the brake switch and jumper means interconnecting the rear brake and front signal lamps for continuous energization of all of the front and rear lamps when the turn signal device is in the neutral position and one of the front and rear lamps when the turn signal device is displaced from the neutral position.

3. The combination of claim 2 including a disconnecting device through which electrical connection to the turn signal device is established, said jumper means being mounted by the disconnecting means.

4. In a vehicle lighting system having a pedal operated brake switch for effecting energization of a pair of rear brake lights and a turn signal device displaceable from a neutral position to effect intermittent energization of one of a pair of front signal lamps, a control circuit comprising, means responsive to closing fo the brake switch when the turn signal device is in the neutral position for continuously energizing both pairs of rear brake lights and front signal lamps, and means responsive to displacement ofthe turn signal device when the brake switch is closed for intermittently interrupting energization of one of the rear brake lights and one of the front signal lamps.

5. The combination of claim 4 including pilot lamp means operatively connected to the rear brake lights and the front signal lamps for indicating the operative condition of both the brake switch and the turn signal device.

References Cited

UNITED STATES PATENTS 2,835,880  5/1958  Daws _____ 340—67 X

THOMAS B. HABECKER, *Acting Primary Examiner.*

NEIL C. READ, *Examiner.*

A. H. WARING, *Assistant Examiner.*

UNITED STATES PATENT OFFICE
CERTIFICATE OF CORRECTION

Patent No. 3,350,684  Dated October 31, 1967

Inventor(s) Clarence C. Turner

It is certified that error appears in the above-identified patent and that said Letters Patent are hereby corrected as shown below:

Fig. 3, the adapter plate 130 should appear reversed with the two vertically spaced, horizontally extending elements pointing left toward receptacle 138 instead of right toward plug 136.

Column 6, Line 27, "means" should be changed to --device--.

Signed and Sealed this

Twenty-fourth Day of August 1976

[SEAL]

Attest:

RUTH C. MASON
Attesting Officer

C. MARSHALL DANN
Commissioner of Patents and Trademarks